United States Patent

[11] 3,618,591

[72] Inventors Edward C. Bradley
1140 Linda Vista Ave., Pasadena, Calif. 91103;
John W. Barr, 653 E. Ada Ave., Glendora, Calif. 91740
[21] Appl. No. 814,551
[22] Filed Apr. 9, 1969
[45] Patented Nov. 9, 1971

[54] CARDIAC OUTPUT DETERMINATION METHOD FOR USE WITH DYE DILUTION PROCEDURES
2 Claims, 3 Drawing Figs.

[52] U.S. Cl. ................................................. 128/2.05 F, 235/78
[51] Int. Cl. ................................................. A61p 5/02
[50] Field of Search ............................................. 128/2.05 F, 2.05 R, 2.05 V; 235/78, 83, 84, 116

[56] References Cited
UNITED STATES PATENTS
2,289,110 7/1942 Ernst et al. ..................... 235/84
2,772,052 11/1956 Studebaker .................. 235/84

OTHER REFERENCES
Glasser, "Medical Physics," Vol. 3, pp. 155 and 156, Year Book Publishers, Chicago, Illinois, 1960 (128/Library)

*Primary Examiner*—William E. Kamm
*Attorney*—White & Haefliger

ABSTRACT: The disclosure concerns a method and apparatus for quickly determining the area under a dye dilution curve, based upon triangle congruency, for use in rapid determination of cardiac output.

PATENTED NOV 9 1971
3,618,591
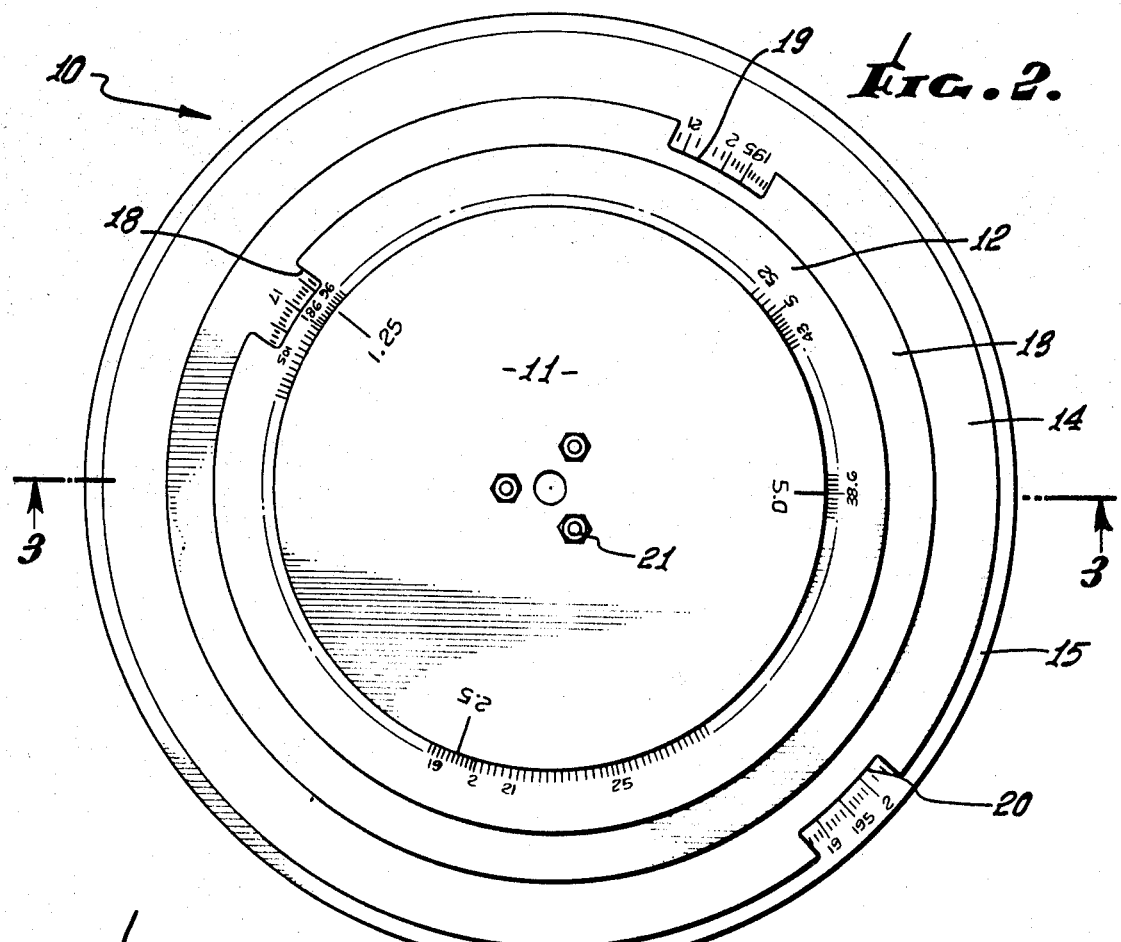
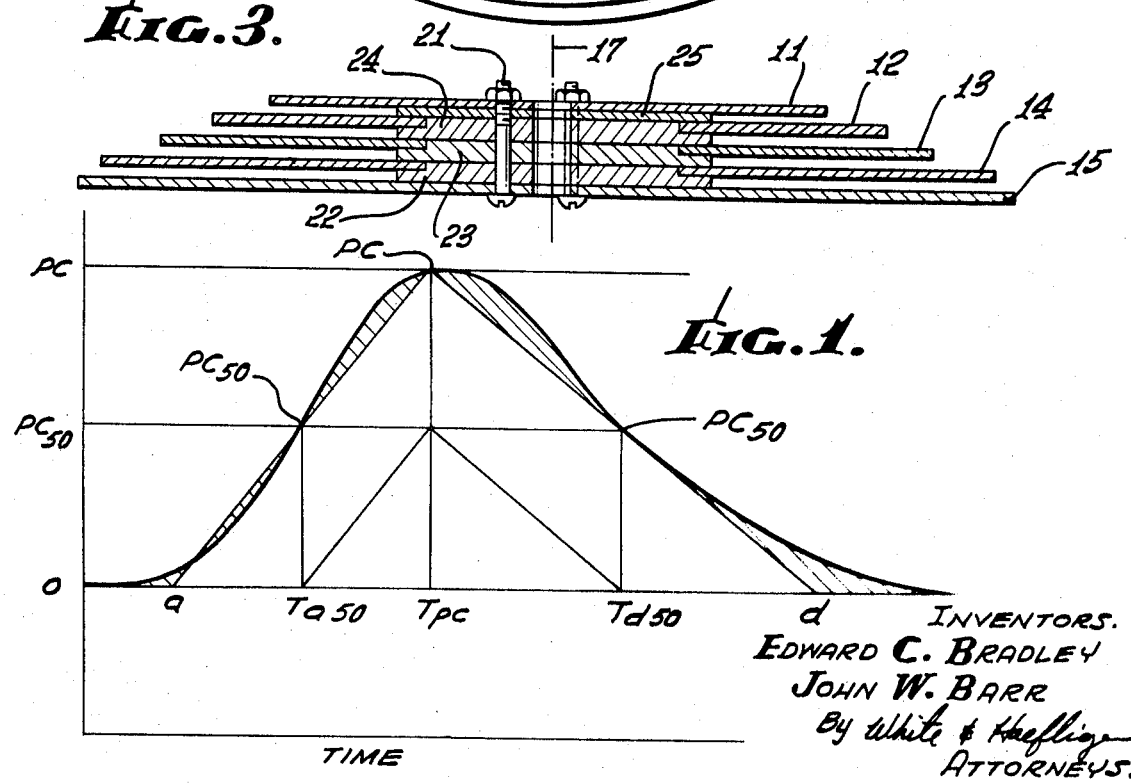
INVENTORS.
EDWARD C. BRADLEY
JOHN W. BARR
By White & Haefliger
ATTORNEYS.

CARDIAC OUTPUT DETERMINATION METHOD FOR USE WITH DYE DILUTION PROCEDURES

BACKGROUND OF THE INVENTION

This invention relates generally to techniques of estimating cardiac output, and more particularly concerns method and apparatus for quickly arriving at cardiac output estimations through use of dye dilution curves.

The determination of cardiac output (rate of blood flow) from dye dilution curves is accepted as a reliable technique.

One way to obtain such a curve involves injection of a known quantity of dye (for example, 2.5, 5.0, or 10 mg. of Indocyanine green dye) into the blood through a catheter placed in the heart, as an isotopic indicator. Arterial blood is then continuously withdrawn, as for example from the femoral artery catheterized percutaneously, and passed through a dichromatic densitometer. Alternatively, a suitable densitometer may be such as to be attached to a portion of the human or animal anatomy, to direct radiation through a blood vessel or flow region, for dye concentration measurement purposes.

The analog signal output of the densitometer resulting from wave fronts of changing optical density at 805 millimicrons due to changing dye concentration is continuously recorded, optical density expressed as millimeter deflection on the record being taken as the variable and transcribed to a semilogarithmic plot, with a suitable extrapolation of the exponentially decaying down slope, to produce the dye dilution curve. Furthermore, once having defined the dye curve in this fashion, the integration of concentration values per unit time presents another mathematical task. All this is done for the estimation of the area beneath the curve. The calculated area (A) is then used in the formula:

$$I \times 60 / A \times CF = \text{Flow} \quad (1)$$

Where:
- $I$ = amount of indicator injected
- $60$ = conversion of second-flow to minute-flow
- $CF$ = calibration factor for converting recorder deflection to concentration of indicator dye.

The above steps render hand calculation of a single emergency cardiac output impractical and that of sequential determinations, impossible. Computer technology has alleviated much of the difficulty by online application. However, due to the high cost of computing equipment attempts at shortcut determinations have been made. The application of short formulas, based on the 'forward triangle' of the dye curve, have not been completely satisfactory for the calculation of area (A), especially in low-perfusion states.

SUMMARY OF THE INVENTION

It is a major object of the present invention to provide method for quickly determining the area under the dye dilution curve, to afford a way to make use of that information in the rapid determination of cardiac output. Further, the invention enables determination of cardiac output by means of portable equipment taken to the patient's bedside.

In its method aspects the invention basically involves the steps of a. suddenly injecting a quantity I of dye into a blood flow channel of the heart;

b. determining peak concentration PC of the dye flowing in the blood in a body vessel;

c. determining the time interval $T_{50}$ that elapses between the occurrences of 50 percent peak concentrations of the dye during increase and decrease of such concentrations in that vessel; and d. obtaining a value for such blood flow as a function of $I/PC \times T_{50}$.

In its apparatus aspects, the invention concerns the provisions of a calculator operable to quickly evaluate the cardiac output expression $K/PC \times T_{50} \times CF$, and includes: a first member having logarithmically spaced indicia thereon representing values of K corresponding to quantities of dye injected into a body blood flow channel; second, third and fourth members having logarithmically spaced indicia thereon representing values of PC, $T_{50}$ and CF, the latter being a calibration factor correlating recorder output with dye concentration, such members having paired adjacency for relative adjustment to perform successive divisions by the values of PC, $T_{50}$ and CF; and a fifth member that is immobile relative to the first member and which has logarithmically spaced indicia thereon upon which is indicated the quotient resulting from the series of divisions. Typically, the members are circular, they have a common axis, they are of progressively increasing diameter, and the second, third and fourth members have quotient indicators thereon which are adjacent the indicia on the third, fourth and fifth members respectively. Also, the second, third and fourth members may be rotors respectively overlapping the indicia on the third, fourth and fifth rotors.

These and other objects and advantages of the invention, as well as the details of an illustrative embodiment, will be more fully understood from the following detailed description of the drawings, in which:

BRIEF DESCRIPTION OF THE DRAWINGS

FIG. 1 is a representative dye dilution curve;

FIG. 2 is a plan view of a calculator operable to calculate blood flow; and

FIG. 3 is a section taken on line 3—3 of FIG. 2.

DESCRIPTION OF PREFERRED EMBODIMENT

The dilution curve of FIG. 1 is illustrative of curves using Indocyanine-green dye (Cardio-Green R) as indicator, the sensing devices comprising dichromatic densitometer assemblies (as for example Waters XC 302 or XE 302). The analog signals of changes in indicator concentration were recorded on multichannel recorders (such as Waters MR-105, Sanborn 964, or Beckman RB Dynograph). Since the dye dilution principle was applied to estimates of cardiac output as well as segmental flows, the sites of injection of indicator varies from right atrium to renal artery. Likewise, the sampling position varied. For the flow-through densitometer system, constant and continuous sampling of blood was made through a catheter inserted into the brachial artery, femoral artery, radial artery, renal artery or renal vein, using infusion-withdrawal pumps at delivery speeds of 15.3 millimeters per minute. For indirect sampling, application of the sensing densitometer was made at the ear pinna, tongue, or the nape of the neck. The subjects consisted of humans, rabbits, and dogs. The humans were all in circulatory failure and determinations of cardiac output were made at the bedside in the standard fashion. The amounts of dye injected also varied from 1.25 mg. to 25 mg. of indocyanine-green dye in volumes of 0.5 to 2.0 ml. The preparation and injection of the dye was accomplished using calibrated syringes. Cardiac outputs and segmental flow dye dilution curves were performed in anesthetized animals, using pentobarbital 30 mg./kg. Regardless of the injection site, all quantities of indicator were administered in less than 0.5 seconds. Since the area of dye dilution curves is dependent on the size of the subject, quantity of dye injected, sampling site, amplification of recorder system, as well as the hemodynamic state of the subject, we are concerned solely with the areas beneath the curves and only indirectly with the physiologic parameter of flow.

In the FIG. 1 representation of an actual dye curve, there are identified peak concentration (PC), and one-half the peak concentration ($PC_{50}$) on both the ascent and descent regions of the curve. A line has been drawn from PC perpendicular to the time scale at the base of the curve, the intercept on the baseline being designated $T_{PC}$. Lines are drawn from PC through $PC_{50}$ on both the ascent and descent. The intercept of this ascent line with the baseline is designated '$a$.' Similarly the intercept of the descent line with the baseline is designated '$d$.' Triangles $a$, $T_{PC}$, PC and $d$, $T_{PC}$, PC are thus inscribed representing 'fore' and 'aft' portions of the area of the dye dilution curve.

Additional lines are drawn perpendicular to the time scale from the $PC_{50}$ points on both ascent and descent, and the resulting intercepts with the baseline are labeled $T_{a50}$ and $T_{d50}$, respectively. An additional line is drawn from $PC_{50}$ on the ascent to $PC_{50}$ on the descent, bisecting perpendicularly line PC, $T_{pc}$. From this bisecting intercept a line is drawn to $T_{a50}$ and another to $T_{d50}$. Thus both 'fore' and 'aft' original triangles are each converted to contain four triangles, the individual triangles of the 'fore' group being congruent, and the individual triangles of the 'aft' group are also congruent.

Since the area of a triangle is equal to one-half its height times its base, the base of each of the four triangles in the 'fore' group is equal to the span in time from $T_{a50}$ to $T_{pc}$ and hereafter designated $T_{a50pc}$. Their individual heights are equal to $PC_{50}$. Therefore the area of the entire forward triangle is equal to the sum of the these four congruent triangles, i.e.

$$4 \times \tfrac{1}{2}(T_{a50pc} \times PC_{50}) = PC, a, T_{pc} \quad (2)$$

$$\text{or, } 2(T_{a50pc} \times PC_{50}) = PC, a, T_{pc} \quad (3)$$

$$\text{or, } T_{a50pc} \times PC = PC, a, T_{pc} \quad (4)$$

Likewise the base of each of the four triangles in the 'aft' group is equal to the span in time from $T_{pc}$ to $T_{d50}$, henceforth designated $T_{d50pc}$. Their individual heights are equal to $PC_{50}$. Therefore, the area of the entire 'aft' triangle is equal to the sum of these four congruent triangles, i.e.

$$4 \times \tfrac{1}{2}(T_{d50pc} \times PC_{50}) = PC, d, T_{pc} \quad (5)$$

$$\text{or, } 2(T_{d50pc} \times PC_{50}) = PC, d, T_{pc} \quad (6)$$

$$\text{or, } T_{d50pc} \times PC = PC, d, T_{pc} \quad (7)$$

Combining the two major triangles for total area:

$$(PC \times T_{a50pc}) + (PC \times T_{d50pc}) = a, PC, d \quad (8)$$

$$\text{or, } PC(T_{a50pc} + T_{d50pc}) = a, PC, d \quad (9)$$

$$\text{or, } PC \times \text{Total } T_{50} = a, PC, d \quad (10)$$

Therefore in order to calculate the entire triangular area beneath this curve, the time in seconds from point $PC_{50}$ on the ascent of the curve to point $PC_{50}$ on the descent of the curve, designated $T_{50}$, is multiplied by the peak concentration, recorded for example in millimeters. The area units are millimeter-seconds (mm.-sec.).

The rapidly obtained value for $A = PC \times T_{50}$ can then be inserted in the flow formula of equation (1) to quickly obtain a value for cardiac output. The following equation may also be used, as being equivalent to equation (1):

$$51.4 \times I/PC \times T_{50} \times CF = \text{flow} \quad (11)$$

where:
- $I$ = amount of dye injected in milligrams
- $PC$ = peak concentration, as measured on the plotted dye dilution curve, in millimeters
- $T_{50}$ = time span, in seconds, of the time interval between occurrences of 50 percent peak concentrations of dye, during increase and decrease of dye concentration in the body vessel (sampling point)
- $CF$ = calibration factor to correlating recorder output with dye concentration in the blood, and with dimensions such that the resultant flow is in terms of millimeters per minute.

We have correlated the values obtained with this new formula and those values for the same areas derived by the standard longhand logarithmic extrapolation method, and have found exceedingly close correlation. This pertains over a wide range of areas and the values at the extremes probably are areas seldom seen in the clinical setting. This method is highly advantageous in view of its rapidity in connection with the use of portable hemodynamic and metabolic monitoring units for bedside diagnosis and therapeutic guidance in the care of the critically ill patient. Thus, the formula facilitates accurate and rapid estimates of cardiac output and therefore related parameters. Other advantages are as follows:

1. a minimal number of measurements, PC and $T_{50}$.
2. no correction for time which can augment error.
3. points of measure fall on the more resolute portions of the curve, i.e. no equivocation about time of onset of the curve.
4. simplicity of computation.
5. use of the entire dye curve area and thereby avoid the question of relationship of forward and aft triangles.
6. facility for directly incorporating the formula for area into the formula for flow.

FIGS. 2 and 3 illustrate a highly useful calculator for quickly obtaining values for flow represented by the expression $$K/PC \times T_{50} \times CF = \text{flow} \quad (12)$$

The calculator includes a first member, as for example disc 11 having logarithmically spaced indicia thereon representing values of K corresponding to quantities of dye injected into a body flow channel (as for example the front). Representative K values 1.25, 2.5 and 5.0 milligrams are shown (the circular positions of same at the same time representing the products of 51.4 with 1.25, 2.5 and 5.0 respectively).

Second, third and fourth members, such as rotors 12, 13, and 14, have logarithmically spaced indicia thereon representing values of PC, $T_{50}$ and CF, referred to above. These rotors are in such paired adjacency as to be adjustable to perform successive divisions by the values PC, $T_{50}$ and CF. Thus, the selected K value 5.0 mg. may be divided by the measured PC value 38.6 mm. on rotor 12, by alignment of these values, the quotient being represented by the position of the indicator value 1 on rotor 12 relative to disc 11. Next, the measured $T_{50}$ value 17.2 seconds on rotor 13 may be divided into that quotient by rotating that rotor until 17.2 is aligned with the indicator value 1 on rotor 12, the quotient being represented by the position of the indicator value 1 on rotor 13 relative to disc 11. Finally, the calibration factor (as for example 0.0002 mg./ml./mm.) is divided into the latter quotient by rotating rotor 14 until 0.0002 thereon is opposite the indicator value 1 on rotor 13, the quotient being represented by the position of indicator value 1 on rotor 14 relative to disc 11.

A fifth member such as disc 15 is immobile relative to disc 11, and has logarithmically circularly spaced indicia thereon such that the final quotient is seen opposite the indicator value 1 on rotor 14. Note that members 11–15 have a common axis 17; they are of progressively increasing diameter; the indicia thereon are circularly arranged; and the second, third and fourth rotors 12–14 overlap the indicia on members 13–15 respectively. Also note the windows 18–20 formed by the members 12–14 which are opposite the 1 value indicator thereon.

FIG. 3 shows representative mounting of the members 11–15. Discs 11 and 15 are connected by fasteners 21 passing through washers 22–25 upon which rotors 12–14 are mounted for rotation about axis 17.

We claim:

1. In the method of estimating cardiac output by determining blood flow rate from the heart, the steps that include
   a. suddenly injecting a quantity I of dye into a body blood flow channel,
   b. determining the peak concentration PC of the dye flowing in the blood in a body vessel,
   c. determining the time interval $T_{50}$ that elapses between the occurrences of approximately 50 percent peak concentrations of the dye during increase and decrease of said dye concentrations in that vessel, and
   d. obtaining a value for said blood flow as a function of $I/PC \times T_{50}$.

2. The method of claim 1, wherein said step (d) comprises determining a value for flow in ml./min. by evaluation of the expression $$51.4 \times I/PC \times T_{50} \times CF$$

where
I is measured in milligrams
PC is measured in millimeters
$T_{50}$ is measured in seconds
and CF is a calibration factor correlating recorder output with dye concentration in the blood,
and said steps (b) and (c) include detecting and recording the concentration of dye in the blood as a function of time.

* * * * *